US009558541B2

(12) United States Patent
Kim et al.

(10) Patent No.: US 9,558,541 B2
(45) Date of Patent: Jan. 31, 2017

(54) METHOD OF CORRECTING IMAGE OVERLAP AREA, RECORDING MEDIUM, AND EXECUTION APPARATUS

(71) Applicant: CJ CGV CO., LTD., Seoul (KR)

(72) Inventors: Hwan Chul Kim, Seoul (KR); Su Ryeon Kang, Goyang-si (KR); Jihyung Kang, Hwaseong-si (KR)

(73) Assignee: CJ CGV CO., LTD., Seoul (KR)

( * ) Notice: Subject to any disclaimer, the term of this patent is extended or adjusted under 35 U.S.C. 154(b) by 183 days.

(21) Appl. No.: 14/557,919

(22) Filed: Dec. 2, 2014

(65) Prior Publication Data
US 2015/0161775 A1 Jun. 11, 2015

(30) Foreign Application Priority Data

Dec. 9, 2013 (KR) .................. 10-2013-0152593

(51) Int. Cl.
| G09G 5/00 | (2006.01) |
| G06T 5/50 | (2006.01) |
| G06F 3/14 | (2006.01) |
| G06T 5/00 | (2006.01) |

(52) U.S. Cl.
CPC .............. G06T 5/50 (2013.01); G06F 3/1446 (2013.01); G06T 5/009 (2013.01); *G06T 2207/10024* (2013.01)

(58) Field of Classification Search
CPC ........... G03B 37/04; G06F 3/1446; G06T 5/50
See application file for complete search history.

(56) References Cited

U.S. PATENT DOCUMENTS

| 6,545,685 | B1 | 4/2003 | Dorbie | |
| 6,561,651 | B1 * | 5/2003 | Kubota | ................. G03B 21/28 348/E9.012 |
| 2002/0012004 | A1 * | 1/2002 | Deering | ............... G06T 3/0081 345/589 |
| 2002/0057361 | A1 * | 5/2002 | Mayer, III | ............... H04N 9/12 348/383 |

(Continued)

FOREIGN PATENT DOCUMENTS

| CN | 1543207 A | 11/2004 |
| CN | 1898953 A | 1/2007 |

(Continued)

OTHER PUBLICATIONS

Bhasker, Ezekiel S. et al., "Asynchronous Distributed Calibration for Scalable and Reconfigurable Multi-Projector Displays," IEEE Transactions on Visualization and Computer Graphics, vol. 12, Issue 5, Oct. 2006, pp. 1101-1108.

(Continued)

Primary Examiner — Charles Tseng
(74) Attorney, Agent, or Firm — Hauptman Ham, LLP

(57) ABSTRACT

Disclosed herein is a method of correcting an image overlap area. More specifically, the method includes steps of identifying an overlap area between images projected by a plurality of projectors, determining a difference in at least one of brightness and color between the overlap area and non-overlap area of images, analyzing RGB information of a projected image, and controlling brightness or color of an image projected on the overlap area or the non-overlap area in response to the RGB information.

13 Claims, 4 Drawing Sheets

(a)

(b)

(56) References Cited

U.S. PATENT DOCUMENTS

| | | | |
|---|---|---|---|
| 2002/0122113 A1* | 9/2002 | Foote | G06T 3/4038 348/48 |
| 2005/0206856 A1* | 9/2005 | Ishii | G03B 37/04 353/94 |
| 2006/0181685 A1* | 8/2006 | Hasegawa | G03B 37/04 353/69 |
| 2007/0171380 A1* | 7/2007 | Wright | G03B 21/14 353/69 |
| 2009/0213335 A1* | 8/2009 | Kondo | G03B 37/04 353/30 |
| 2012/0014593 A1* | 1/2012 | Jaynes | H04N 1/6055 382/165 |

FOREIGN PATENT DOCUMENTS

| | | |
|---|---|---|
| CN | 101888511 A | 11/2010 |
| JP | 1999098439 A | 4/1999 |
| JP | 2011217305 A | 10/2011 |
| KR | 1020120020793 A | 3/2012 |

OTHER PUBLICATIONS

International Search Report for PCT/KR2014/011647 dated Feb. 11, 2015.

\* cited by examiner (a)

(b)

(a)

(b)

METHOD OF CORRECTING IMAGE OVERLAP AREA, RECORDING MEDIUM, AND EXECUTION APPARATUS

CROSS REFERENCE TO RELATED APPLICATION

The present application claims the benefit of Korean Patent Application No. 10-2013-0152593 filed in the Korean Intellectual Property Office on Dec. 9, 2013, the entire contents of which are incorporated herein by reference.

BACKGROUND OF THE INVENTION

1. Technical Field

The present invention relates to an image processing method and, more particularly, to an image correction method for providing images generally having a sense of unity by correcting an area that belongs to images projected by a plurality of projectors and where images are overlapped.

2. Description of the Related Art

In a prior art, in order to play back images, such as movies and advertisements in a theater, a two-dimensional (2D) image is projected on a single screen disposed at the front of a movie theater. In such a system, audiences inevitably experience only 2D images.

A 3D image-related technology capable of providing a stereoscopic image to audiences has recently been developed. The 3D image technology is based on a principle that when different images enter the left eye and right eye of a person and are merged in a brain, the person is able to feel a three-dimensional effect even in a 2D image. In such a 3D image technology, two cameras on which different polarization filters are mounted are used to capture images, and glasses on which a polarization filter is mounted is used so that different images enter the left eye and right eye of a person when the person watches an image.

However, such a 3D technology may provide a stereoscopic image to a user, but is problematic in that a degree of immersion for an image itself is low because a user merely watches an image played back in a single screen. Furthermore, there is a problem in that the direction of a three-dimensional effect felt by audiences is limited to a direction in which a single screen is placed. Furthermore, the conventional 3D technology is problematic in that it may cause inconvenience for audiences who watch images because the audiences must wear glasses on which a polarization filter is mounted and that sensitive audiences may feel dizzy or sick because different images are forced to enter the left eye and right eye of a user.

Accordingly, a so-called "multi-projection system" (a preceding application of this application) capable of solving the problems of a conventional screening system based on a single screen was proposed. In this case, the "multi-projection system" means a system in which a plurality of projection surfaces (e.g., a screen and the surface of a wall) is disposed in the vicinity of stands and images having a sense of unity are played back on the plurality of projection surfaces so that audiences may have three-dimensional effects and immersive experiences. Furthermore, a "multi-projection theater" means a theater in which such a multi-projection system has been constructed. FIG. 1 illustrates an example of such a multi-projection system.

In order to effectively manage the multi-projection system, there is a need for technologies capable of effectively correcting images projected on a plurality of projection surfaces. The reason for this is that in the multi-projection system, an image correction process is very complicated and it is very likely that an error may occur because a plurality of images projected on a plurality of projection surfaces not on a single projection surface needs to be integrated and corrected and a method of correcting a plurality of images needs to be changed according to a change in the structure of a theater. Accordingly, there is a need for technologies that may assist the image correction process of such a multi-projection system.

In addition to such a multi-projection system, images may be projected on a single projection surface using a plurality of projectors. For example, images may be projected on a single projection surface using a plurality of projectors if the width of a projection surface is wide or if a length-breadth ratio of a projection surface is not handled by a single projector.

If images are to be projected using a plurality of projectors, it is very important to provide images having a sense of unity. In particular, images need to be corrected so that the boundaries of images or the overlap area and non-overlap area of images projected by respective projectors are not distinct.

SUMMARY OF THE INVENTION

Accordingly, the present invention has been made keeping in mind the above problems occurring in the prior art, and an object of the present invention is to play back images projected by a plurality of respective projectors generally in a sense of unity when the images are projected by the plurality of projectors.

Another object of the present invention is to lower a sense of difference between an overlap area and a non-overlap area by controlling various factors of images projected on an image overlap area.

In an aspect of the present invention, a method of correcting an image overlap area includes steps of identifying an overlap area between images projected by a plurality of projectors, determining a difference in at least one of brightness and color between the overlap area and non-overlap area of images, analyzing RGB information of a projected image, and controlling brightness or color of an image projected on the overlap area or the non-overlap area in response to the RGB information.

In this case, the step of identifying the overlap area may include computing an area where images are overlapped on a projection surface using image projection area information for each of the plurality of projectors that has been stored in a master device for controlling the projectors or that has been computed. Furthermore, the step of identifying the overlap area may include computing one or more of the coordinates of an area where images are overlapped and the degree of the overlap.

The step of determining the difference may include determining the difference in the brightness between the overlap area and the non-overlap area, and the step of controlling the brightness or color may include controlling the brightness of the overlap area or the non-overlap area based on the brightest overlap area.

In an embodiment of the present invention, the step of determining the difference may include determining the difference for each frame of an image or for each pixel of an image.

The step of analyzing the RGB information may be executed before the images are projected, and control of the brightness and color of the images may be scheduled in response to the analyzed RGB information. In another embodiment, the step of analyzing the RGB information may be executed while the images are projected, and the step of controlling the brightness or color may be executed by incorporating the analyzed RGB information into the brightness or color in real time.

In an embodiment of the present invention, blur filtering may be applied to the step of controlling the brightness or color at the boundary of the overlap area and the non-overlap area. The step of controlling the brightness or color may include incorporating a transparency variable into the image projected on the overlap area by each of the projectors. A chromatic aberration parameter may be further incorporated into the transparency variable.

The method of correcting an image overlap area in accordance with an embodiment of the present invention includes a computer-readable recording medium on which a program for executing the method has been recorded and an apparatus for executing the program.

DETAILED DESCRIPTION

Some exemplary embodiments of the present invention are described in detail with reference to the accompanying drawings.

Figure 1:
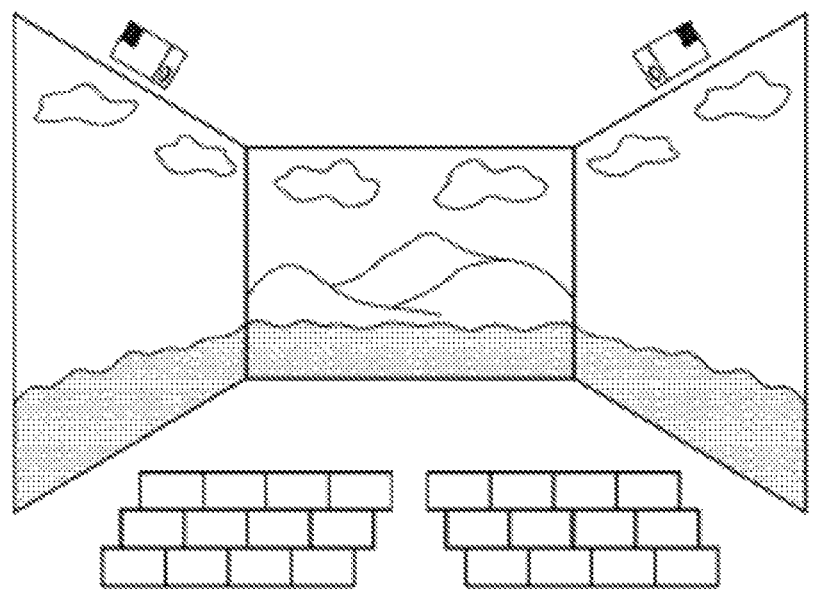
FIG. 1 is a diagram illustrating an example of the structure of a multi-projection system.
Figure 2:
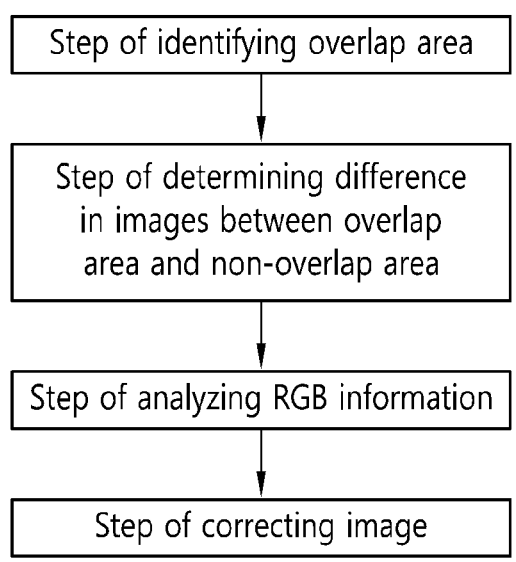
FIG. 2 is a flowchart illustrating an embodiment of the present invention.

FIG. 2 is a flowchart illustrating an embodiment of the present invention. A method of correcting an image overlap area in accordance with an embodiment of the present invention may include steps of identifying an overlap area between images projected by a plurality of projectors, determining a difference in at least one of brightness and color between the overlap area and non-overlap area of images, analyzing RGB information of images projected on the overlap area, and controlling the brightness or color of images projected on the overlap area or the non-overlap area in response to the RGB information.

In order to check an overlap area between images, first, it is necessary to check that images projected by respective projectors are projected on which points of a projection surface. To this end, in an embodiment of the present invention, a reference image having a specific pattern (e.g., a lattice pattern) is projected on each of the projectors, and on which points on the projection surface is the reference image projected is determined. Thereafter, after the coordinates of a point overlapped between the reference images projected by the respective projectors are obtained, whether a location on the projection surface corresponds to an overlap area or a non-overlap area can be checked, and what the overlap area corresponds to which part within the image can also be checked. In order to easily check an overlap area, the reference images projected by the projectors that are consecutively disposed may have the same shape, but may have different hues.

In another embodiment, an area where images are overlapped on a projection surface may be computed using image projection area information according to each projector that has been stored in a master device configured to control a plurality of projectors or computed. In the master device, that is, an apparatus for executing the method of correcting an image overlap area in accordance with an embodiment of the present invention, image projection area information, that is, information regarding that each projector projects an image on which area of a projection surface, may be computed by various processors, or previously computed projection area information may be stored in a storage device. Accordingly, the location, coordinates, etc. of an overlap area between images projected by a plurality of projectors may be obtained such information, and whether the overlap of a specific overlap area is generated (i.e., an overlap degree) due to how many projectors may also be computed.

Figure 4:
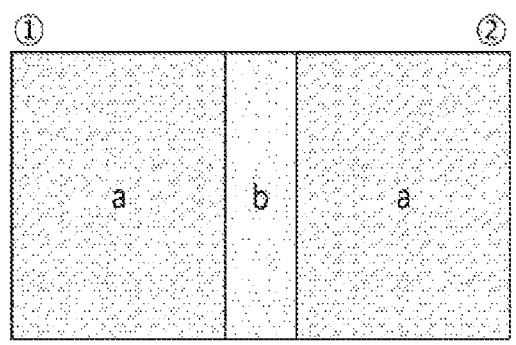
FIG. 4 is a diagram illustrating a difference between brightness of an overlap area and brightness of a non-overlap area.
Figure 4:
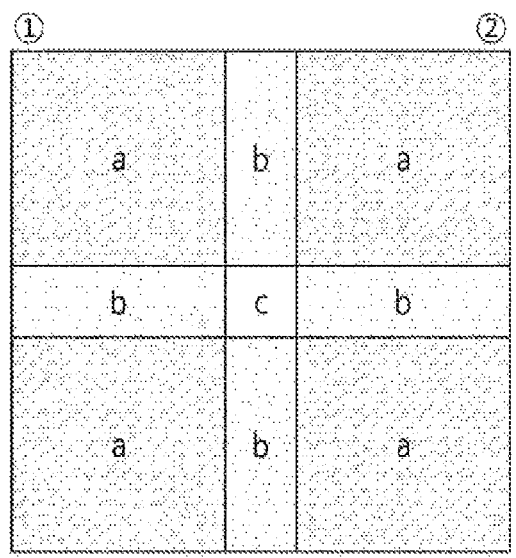

FIG. 4 is a diagram illustrating a difference between brightness of an overlap area and brightness of a non-overlap area. FIG. 4(a) illustrates an example in which two projectors 1 and 2 project images, wherein "a" corresponds to a non-overlap area and "b" corresponds to an overlap area. Coordinates may be obtained based on the projection surface of the overlap area and the non-overlap area using the aforementioned method or a method to be described later, or coordinates may be obtained based on an image projected on a corresponding location.

FIG. 4(b) illustrates an example in which four projectors 1 to 4 project images, wherein "a" corresponds to a non-overlap area, "b" corresponds to an area where images projected by two of the four projectors are overlapped, and "c" corresponds to an area where images projected by the four projectors are overlapped. To distinguish a non-overlap area from an overlap area and vice versa is important, but it is also important to check that the overlap of an overlap area is generated due to how many projectors in order to practice an embodiment of the present invention. The reason for this is that a degree of correction is different depending on the degree that images are overlapped. Referring to FIG. 4, the overlap area is indicated relatively brighter than the non-overlap area. The overlap area becomes bright because the colors of overlapped images are overlapped or the amount of light of the overlapped images is added. An embodiment of the present invention into which such a factor is incorporated is described later.

After the overlap area and the non-overlap area are identified and coordinates on the projection surface of each area, coordinates on each projector, etc. are obtained, a difference in brightness, color, etc. that occurs between the overlap area and non-overlap area of images is determined.

In an embodiment of the present invention, in order to determine a difference in brightness, the amount of light of an image projected at a specific point of time (i.e., in a specific frame) while the image is played back is extracted for each pixel. The amount of light may be extracted by analyzing the image or may be extracted by checking the amount of light corresponding to each of the areas (i.e., an overlap area and a non-overlap area) of all images projected on a projection surface.

In an embodiment of the present invention, after a difference in the brightness and color of each pixel is determined for each frame of an image, RGB information of images projected on an overlap area is analyzed. This reason for this is that a projected image may be optimally controlled depending on the brightness and color of the image.

A primary object of the present invention is to correct a difference in brightness and color when a dark image to a black image is projected on an overlap area. In order to represent black within an image, nothing color needs to be projected by a projector (i.e., R, G, B values are 0) and nothing light needs to be projected by a projector. However, since a projector has to project ever-changing color and light corresponding to each pixel, a very small amount of light is output because light and color are not fully blocked although black is represented.

Although the amount of light output to a projection surface is minute when black is represented, the pupil of a person is open, that is, the pupil is able to sense a minute difference in brightness, because the surroundings of an environment in which a projector projects an image is dark (e.g., a theater). If brightness of light in an overlap area is added, a person may recognize a difference in brightness between the overlap area and a non-overlap area.

As described above, when a dark (black) image is projected, light generated by a projector is inevitable and the amount of the light may not be reduced. Accordingly, in an embodiment of the present invention, brightness of an overlap area or non-overlap area is controlled based on the brightest overlap area. That is, brightness of the remaining areas is raised according to the brightest area. This may be expressed as in Equation 1 below.

$$R(x,y)=R_0(x,y)+\text{Offset}(x,y)$$

$$G(x,y)=G_0(x,y)+\text{Offset}(x,y)$$

$$B(x,y)=B_0(x,y)+\text{Offset}(x,y) \quad (1)$$

In Equation 1, (x, y) denotes a specific location and coordinates of an image projected by a projector. $R_0(x, y)$, $G_0(x, y)$, and $B_0(x, y)$ are respective R, G, and B values in (x, y) prior to correction. Offset(x, y) denotes a color, brightness correction value in (x, y). R(x, y), G(x, y), and B(x, y) denote respective R, G, and B values after color and brightness have been corrected in (x, y). Images that have been generally unified may be provided by adding a color and brightness correction value, corresponding to Offset(x, y), to an image projected to the dark area of a projection surface.

A secondary object of the present invention is to make the overlap area and non-overlap area of images not distinctly identified with respect to an image having any color/brightness in response to RGB information of an image that is being projected, in addition to raising brightness only in a dark image.

If brightness is controlled based on a dark image (e.g., an image having low brightness or an image having RGB values each close to 0), a sense of difference between an overlap area and a non-overlap area may occur when brightness and RGB values of the image are increased. Accordingly, it is necessary to continue to correct and project images while the images are played back in response to various states of the images. To this end, in an embodiment of the present invention, RGB information of a projected image is analyzed. Since a digital playback image represents color through the sum of RGB values, an image playback device (e.g., the master device) may obtain RGB values corresponding to each frame or pixel of an image that is being played back. In other words, the projected image is implemented in a specific color and seen by an eye of a person. In contrast, the image playback device recognizes, stores, and processes the corresponding color in the form of specific RGB values and thus may obtain RGB values for each frame or for each pixel.

In an embodiment of the present invention, if each of pieces of obtained R, G, B information or the sum of the pieces of obtained R, G, B information is a predetermined value or lower (e.g., each of R, G, B values is closed to 0), a dark area within an image is identified by analyzing R, G, B values corresponding to each frame or pixel within the image and brightness/color of an image projected on the dark area are controlled based on the brightest area because black is represented on a projection surface. In contrast, if R, G, B values are very high (e.g., close to 256), brightness or an image is controlled according to the specification of an image that is being projected because color may be distorted due to a difference in a degree of control if color/brightness are controlled as in a dark area.

In an embodiment of the present invention, images that are being played back may be classified into a bright image, a dark image, and an image whose specific color is significant by analyzing RGB information of the images and may be corrected according to the characteristics of the images that change from moment to moment by controlling brightness and color of the images in response to the analyzed RGB information.

In an embodiment of the present invention, an example of the step of controlling brightness and color of an image in response to RGB information is described in detail below. The present embodiment may be expressed as in Equation 2 below.

$$R(x,y)=R_0(x,y)+\text{Offset}(x,y)*[(255-R_0(x,y))/255]^n$$

$$G(x,y)=G_0(x,y)+\text{Offset}(x,y)*[(255-G_0(x,y))/255]^n$$

$$B(x,y)=B_0(x,y)+\text{Offset}(x,y)*[(255-B_0(x,y))/255]^n \quad (2)$$

In Equation 2, (x, y) denotes a specific location and coordinates of an image projected by a projector. $R_0(x, y)$, $G_0(x, y)$, and $B_0(x, y)$ denote respective R, G, and B values in (x, y) prior to correction. Offset(x, y) denotes color, brightness correction values in (x, y). R(x, y), G(x, y), and B(x, y) denote respective R, G, and B values whose color and brightness have been corrected in (x, y).

RGB color indication is determined between 0 and 255, and a color close to red/green/blue becomes bright as the RGB color indication is close to 255. In accordance with Equation 2, as color becomes bright (in other words, as RGB values increase), the value of $[(255-R_0(x, y))/255]^n$ is reduced. As a result, the value of Offset(x, y) is reduced, and a degree of correction at the point (x, y) is also reduced. That is, a degree that an image is corrected is different depending on the RGB values of an image.

In Equation 2, "n" is an integer and may be selected, if necessary. It was found that an image was properly corrected when "n" was 20 as the results of experiments. It is however to be noted that the experiments are only illustrative and an embodiment of the present invention is not limited to Equation 2 and the "n" value.

In an embodiment of the present invention, the step of analyzing RGB information of images may be executed before the images are projected by the plurality of projectors, and control of the brightness and color of an image may be scheduled in response to the analyzed RGB information. Thereafter, in the step of controlling brightness or color of images, brightness and color of an image projected on an overlap area or a non-overlap area may be controlled using a result in which control of brightness has been scheduled according to a point of time at which the image is played back.

In the present embodiment, a data processing load that results from playing back/projecting an image and simultaneously analyzing and correcting the image can be reduced by obtaining the RGB values of each frame/pixel in the overlap area and non-overlap area of the image before the image is projected and previously scheduling a degree that the image is controlled based on the obtained RGB values.

In another embodiment of the present invention, the step of analyzing RGB information of images may be executed while the images are projected, and the step of controlling the brightness or color of the images may be executed by incorporating the analyzed RGB information into the brightness or color in real time. In the present embodiment, a data processing speed needs to be fast because an image has to be analyzed in real time and to be corrected based on a result of the analysis. However, there is an advantage in that an image can be precisely corrected at timing when the image is played back.

In an embodiment of the present invention, blur filtering is applied when brightness/color is controlled so that the brightness/color is continuously changed at the boundary of an overlap area and a non-overlap area. As a result, a sense of difference at the boundary can be reduced, and a generally unified image can be played back.

In an embodiment of the present invention, in the step of controlling the brightness or color of images, a transparency variable α is incorporated into an image that is projected on an overlap area by each projector. This is for correcting the distortion of the brightness and color of an image attributable to overlap. For example, if a specific pixel within an overlap area is overlapped three times due to images projected by three projectors and projected, the images are played back with brightness that is three times brighter than the original brightness because the colors of the projectors are added. In order to prevent such a problem, each of the images projected by the respective projectors may be displayed with the original brightness by projecting the image by only ⅓ of the original brightness. In this case, ⅓ may be called the transparency variable α. In the above example, the transparency variable has been illustrated as being ⅓, for example, and the transparency variable may be set and applied in accordance with Equation 3 below.

$$C = \Sigma \alpha_i * C, \alpha_1 = 1 \quad (3)$$

In Equation 3, C is color that is finally represented in each pixel, and a is the transparency variable in each pixel.

Equation 3 is described according to another example. Assuming that an $i^{th}$ projector and a $j^{th}$ projector are overlapped left and right by half, the value $\alpha_i$ of the projector i on the left may be reduced from 1 to 0 in the overlap area and the value $\alpha_j$ of the projector j on the right may be increased from 0 to 1 in the overlap area. That is, the value "α" of each pixel of the projectors becomes 0 as the pixel becomes close to the boundary of the overlap area. If $\alpha_i + \alpha_j = 1$ is satisfied in the overlap area, color distortion attributable to color overlap can be corrected.

In addition to the embodiment of the present invention, a chromatic aberration parameter may be further incorporated into the transparency variable. The chromatic aberration parameter is for correcting the occurrence of a chromatic aberration attributable to the transparency variable.

As the results of experiments in which the distortion of an image is corrected in an overlap area according to the aforementioned embodiments, it was found that the image was precisely corrected in most areas, but a chromatic aberration was generated as the transparency variable α becomes close to 0.

In the present embodiment, in order to solve such a problem, an image is corrected by further incorporating the chromatic aberration parameter into the transparency variable α. "1−α" may be set so that the chromatic aberration parameter has a negative correlation with the transparency variable. This is only an example, and various factors for correcting the distortion of a chromatic aberration occurring when the transparency variable is small may be set as the chromatic aberration parameter.

Figure 3:
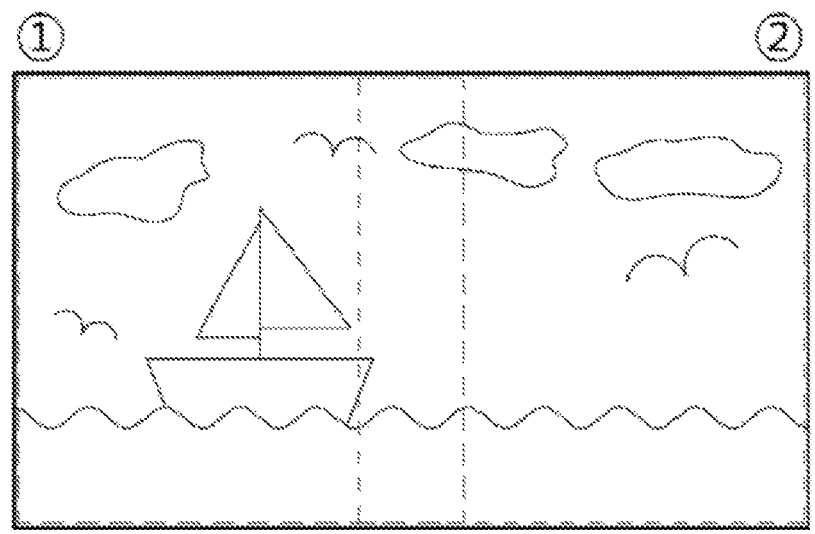
FIG. 3 is a diagram illustrating an example in which images are projected by a plurality of projectors.

FIG. 3 is a diagram illustrating an example in which images are projected by a plurality of projectors.

FIG. 3 illustrates an example in which two projectors project images on a single projection surface. The image of the projector 1 is displayed on the left of the projection surface, and the image of the projector 2 is displayed on the right of the projection surface. An area in the middle of the projection surface in which dotted lines are overlapped corresponds to an overlap area, and the remaining areas correspond to non-overlap areas. In the example of FIG. 3, the images are played back with a sense of unity in the overlap area and the non-overlap areas in the state in which the aforementioned method of correcting an image overlap area in accordance with an embodiment of the present invention has been applied.

Figure 5:
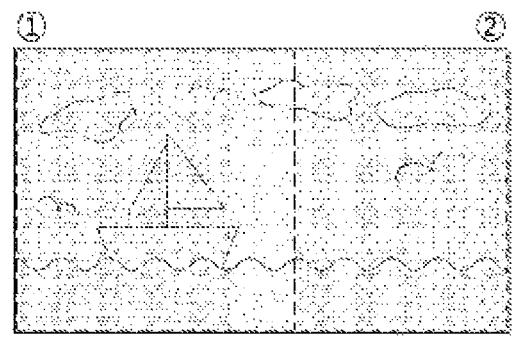
FIG. 5 is a diagram in which images displayed on a projection surface before an embodiment of the present invention is applied is compared with images displayed on the projection surface after the embodiment of the present invention is applied.
Figure 5:
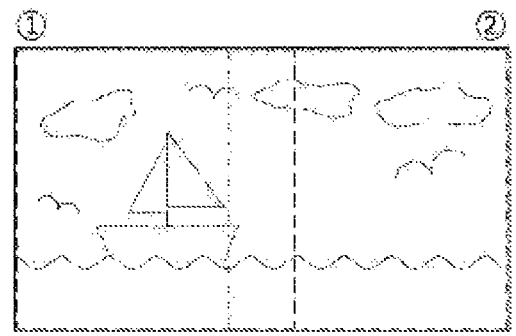

FIG. 5 is a diagram in which images displayed on a projection surface before an embodiment of the present invention is applied is compared with images displayed on the projection surface after the embodiment of the present invention is applied.

FIG. 5(a) illustrates images displayed on a projection surface prior to correction. From FIG. 5(a), it may be seen that an overlap area in the middle is brighter than non-overlap areas on the left and right. If images are projected by a plurality of projectors, a user may feel a sense of difference in the images as in FIG. 5(a). If the aforementioned embodiment of the present invention is applied, unified images, such as those of FIG. 5(b), can be played back.

The present invention may be implemented in the form of a program for executing the method of correcting an image overlap area according to the aforementioned embodiment and includes a computer-readable recording medium on which such a program has been recorded. In this case, the recording medium should be construed as having a wide meaning including a server, a computer, etc. including a storage space, as well as being a recording medium of a narrow meaning, such as an HDD, a CD, or a magnetic disk.

Furthermore, the present invention includes an apparatus for executing such a program, and the execution apparatus (i.e., the master device) may include a projector controller, a computer, a server, etc., for example. In this case, in the method of correcting an image overlap area in accordance with an embodiment of the present invention, elements for executing the method, for example, determination and operation may be performed by a Central Processing Unit (CPU), the storage of information may be performed by a storage element (e.g., a database) within the apparatus, and a user interface may be provided to a user through a display device and may receive user commands through an input device.

In accordance with an embodiment of the present invention, if images are projected using a plurality of projectors, the images generally having a sense of unity can be played back. In particular, a sense of difference between an overlap area and a non-overlap area can be reduced by controlling various factors of images projected on the overlap area or the non-overlap area.

The embodiments of the present invention have been disclosed for illustrative purposes, and those skilled in the art will appreciate that various modifications, additions and substitutions are possible, without departing from the scope and spirit of the invention as disclosed in the accompanying claims.

What is claimed is:

1. A method of correcting an image overlap area, the method comprising:
    identifying overlap areas between images projected by a plurality of projectors;
    determining a difference between the brightest overlap area among the identified overlap areas and non-overlap areas;
    analyzing RGB information of the projected images; and
    adjusting brightness or color of the images projected on the overlap areas or the non-overlap areas based on the analyzed RGB information and the determined difference,
    wherein the brightness or color of the images projected on the overlap areas or the non-overlap areas is adjusted according to the following equations, $$R(x,y)=R_0(x,y)+\text{Offset}(x,y)*[(255-R_0(x,y))/255]^n$$

$$G(x,y)=G_0(x,y)+\text{Offset}(x,y)*[(255-G_0(x,y))/255]^n$$

$$B(x,y)=B_0(x,y)+\text{Offset}(x,y)*[(255-B_0(x,y))/255]^n$$

where (x, y) is a coordinates of a specific location in an image projected by one of the plurality of projectors, $R_0$ (x, y), $G_0$ (x, y) and $B_0$ (x, y) are color values of the specific location in the image projected by said one projector among the plurality of projectors, R(x, y), G(x, y) and B(x, y) are adjusted color values of the specific location in the image projected by said one projector, Offset(x, y) is offset values of the specific location based on the determined difference, and n is an integer.

2. The method of claim 1, wherein
    the identifying the overlap areas comprises computing an area where the images are overlapped on a projection surface using image projection area information on each of the plurality of projectors, and
    the image projection area information is stored in a master device controlling the projectors or the image projection area information is computed by the master device.

3. The method of claim 1, wherein the identifying the overlap areas comprises computing one or more of
    coordinates of an area where the images are overlapped, and
    a degree of the overlap of the images.

4. The method of claim 1, wherein
    the determining the difference comprises determining the difference in the brightness between the brightest overlap area and the non-overlap areas, and
    the adjusting the brightness or color comprises adjusting the brightness of the overlap areas or the non-overlap areas based on the determined difference of the brightest overlap area.

5. The method of claim 1, wherein the determining the difference comprises determining the difference for each frame of the projected images.

6. The method of claim 1, wherein the determining the difference comprises determining the difference for each pixel of the projected images.

7. The method of claim 1, wherein:
    the analyzing the RGB information is executed before the images are projected, and
    the adjusting the brightness and color of the images is scheduled in response to the analyzed RGB information.

8. The method of claim 1, wherein:
    the analyzing the RGB information is executed while the images are projected, and
    the adjusting the brightness or color is executed by incorporating the analyzed RGB information into the brightness or color of the images projected on the overlap areas or the non-overlap areas in real time.

9. The method of claim 1, wherein blur filtering is applied to the adjusting the brightness or color at a boundary of the overlap areas and the non-overlap areas.

10. The method of claim 1, wherein the adjusting the brightness or color further comprises incorporating a transparency variable into the images projected on the overlap areas.

11. The method of claim 10, wherein a chromatic aberration parameter is incorporated into the transparency variable.

12. A non-transitory computer-readable recording medium storing thereon a program, the program, when executed by a processor of a computing device, causing the processor to execute a method of correcting an image overlap area, the method comprising:
    identifying overlap areas between images projected by a plurality of projectors;
    determining a difference between the brightest overlap area among the overlap areas and non-overlap areas;
    analyzing RGB information of the projected images; and
    adjusting brightness or color of the images projected on the overlap areas or the non-overlap areas based on the analyzed RGB information and the determined difference,
    wherein the brightness or color of the image projected on the overlap areas or the non-overlap areas is adjusted according to the following equations, $$R(x,y)=R_0(x,y)+\text{Offset}(x,y)*[(255-R_0(x,y))/255]^n$$

$$G(x,y)=G_0(x,y)+\text{Offset}(x,y)*[(255-G_0(x,y))/255]^n$$

$$B(x,y)=B_0(x,y)+\text{Offset}(x,y)*[(255-B_0(x,y))/255]^n$$

where (x, y) is a coordinates of a specific location in an image projected by one of the plurality of projectors, $R_0$ (x, y), $G_0$ (x, y) and $B_0$ (x, y) are color values of the specific location in the image projected by said one projector among the plurality of projectors, R(x, y), G(x, y) and B(x, y) are adjusted color values of the specific location in the image projected by said one projector, Offset(x, y) is offset values of the specific location based on the determined difference, and n is an integer.

13. An apparatus for correcting an image overlap area, the apparatus comprising
    a plurality of projectors configured to project images on a screen;
    a project controller configured to
        identify overlap areas between the projected images on the screen;

determine a difference between the brightest overlap area among the overlap areas and non-overlap areas;

analyze RGB information of the projected images; and adjust brightness or color of the images projected on the overlap areas or the nonoverlap areas based on the analyzed RGB information and the determined difference, wherein the brightness or color of the images projected on the overlap areas or the nonoverlap areas is adjusted according to the following equations, $$R(x,y) = R_0(x,y) + \text{Offset}(x,y) * [(255 - R_0(x,y))/255]^n$$

$$G(x,y) = G_0(x,y) + \text{Offset}(x,y) * [(255 - G_0(x,y))/255]^n$$

$$B(x,y) = B_0(x,y) + \text{Offset}(x,y) * [(255 - B_0(x,y))/255]^n \qquad (2)$$

where (x, y) is a coordinates of a specific location in an image projected by one of the plurality of projectors, $R_0(x, y)$, $G_0(x, y)$ and $B_0(x, y)$ are color values of the specific location in the image projected by said one projector among the plurality of projectors, R(x, y), G(x, y) and B(x, y) are adjusted color values of the specific location in the image projected by said one projector, Offset(x, y) is offset values of the specific location based on the determined difference and n is an integer.

* * * * *